United States Patent
Yang et al.

(10) Patent No.: US 10,843,139 B2
(45) Date of Patent: Nov. 24, 2020

(54) SUPEROLEOPHOBIC MEMBRANES FOR OIL/WATER SEPARATION

(71) Applicant: THE TRUSTEES OF THE UNIVERSITY OF PENNSYLVANIA, Philadelphia, PA (US)

(72) Inventors: Shu Yang, Blue Bell, PA (US); Daeyeon Lee, Wynnewood, PA (US); Zhiwei Liao, Philadelphia, PA (US); Gaoxiang Wu, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 0 days.

(21) Appl. No.: 16/312,577

(22) PCT Filed: Jun. 28, 2017

(86) PCT No.: PCT/US2017/039652
§ 371 (c)(1),
(2) Date: Dec. 21, 2018

(87) PCT Pub. No.: WO2018/005595
PCT Pub. Date: Jan. 4, 2018

(65) Prior Publication Data
US 2019/0224629 A1    Jul. 25, 2019

Related U.S. Application Data

(60) Provisional application No. 62/355,817, filed on Jun. 28, 2016.

(51) Int. Cl.
*B01D 61/14* (2006.01)
*B01D 67/00* (2006.01)
(Continued)

(52) U.S. Cl.
CPC ........... *B01D 71/027* (2013.01); *B01D 61/14* (2013.01); *B01D 65/02* (2013.01);
(Continued)

(58) Field of Classification Search
None
See application file for complete search history.

(56) References Cited

U.S. PATENT DOCUMENTS 3,818,989 A * 6/1974 Christopher, Jr. ....... C09K 8/82
166/270.1
7,033,975 B2    4/2006 Baran et al.
(Continued)

FOREIGN PATENT DOCUMENTS

WO    2015/070040 A1    5/2015

OTHER PUBLICATIONS

Shu et al., "COLL: Scalable fabrication of underwater superoleophobic membranes from polymer-grafted silica nanoparticles for oil/water separation", 252nd ACS National Meeting, 2016, Abstract, 1 page.
(Continued)

*Primary Examiner* — Bradley R Spies
(74) *Attorney, Agent, or Firm* — BakerHostetler

(57) ABSTRACT

The present disclosure provides compositions comprising anisotropic chain-like silica nanoparticles functionalized with hydrophilic groups. The anisotropic chain-like silica nanoparticles comprise linked arrays of charged silica nanoparticles, each linked array have at least one linear dimension of from about 100 nm to about 1200 nm and the anisotropic chain-like silica nanoparticles each in have a diameter of from about 10 nm to about 500 nm. These compositions are superoleophobic in the presence of water, e.g., when submerged in water. Also provided are layered coatings comprising these compositions, substrates comprising the layered coatings, articles comprising the layered
(Continued)

coatings, methods of filtering a mixture of water and an oil using the compositions described herein, and methods of preparing a superoleophobic coating on a substrate using the compositions described herein.

23 Claims, 10 Drawing Sheets

(51) Int. Cl.
| | |
|---|---|
| B01D 69/02 | (2006.01) |
| B01D 71/02 | (2006.01) |
| C02F 1/44 | (2006.01) |
| C02F 101/32 | (2006.01) |
| B01D 65/02 | (2006.01) |
| C02F 1/66 | (2006.01) |
| C02F 1/06 | (2006.01) |
| C02F 101/30 | (2006.01) |
| C02F 103/08 | (2006.01) |
| C02F 103/10 | (2006.01) |

(52) U.S. Cl.
CPC ..... *B01D 67/0041* (2013.01); *B01D 67/0046* (2013.01); *B01D 69/02* (2013.01); *C02F 1/44* (2013.01); *C02F 1/66* (2013.01); *B01D 2311/04* (2013.01); *B01D 2311/12* (2013.01); *B01D 2311/2626* (2013.01); *B01D 2325/36* (2013.01); *C02F 2101/301* (2013.01); *C02F 2101/32* (2013.01); *C02F 2101/325* (2013.01); *C02F 2103/08* (2013.01); *C02F 2103/10* (2013.01); *C02F 2303/16* (2013.01); *C02F 2305/08* (2013.01)

(56) References Cited

U.S. PATENT DOCUMENTS

| | | | |
|---|---|---|---|
| 7,563,457 | B2 | 7/2009 | Cha et al. |
| 8,883,308 | B2 | 11/2014 | Polshettiwar et al. |
| 2004/0092396 | A1 | 5/2004 | Glazer et al. |
| 2004/0101822 | A1 | 5/2004 | Wiesner et al. |
| 2011/0253643 | A1* | 10/2011 | Polshettiwar .......... B01J 35/006 210/749 |
| 2012/0273000 | A1 | 11/2012 | Jing et al. |
| 2013/0240447 | A1 | 9/2013 | Solomon et al. |
| 2015/0075989 | A1 | 3/2015 | Solomon et al. |
| 2016/0289498 | A1* | 10/2016 | Yang ...................... B05D 1/02 |

OTHER PUBLICATIONS

Kota et al., "Hygro-responsive membranes for effective oil-water separation", Nature Communications, Aug. 2012, 3:1025, 8 pages.

* cited by examiner

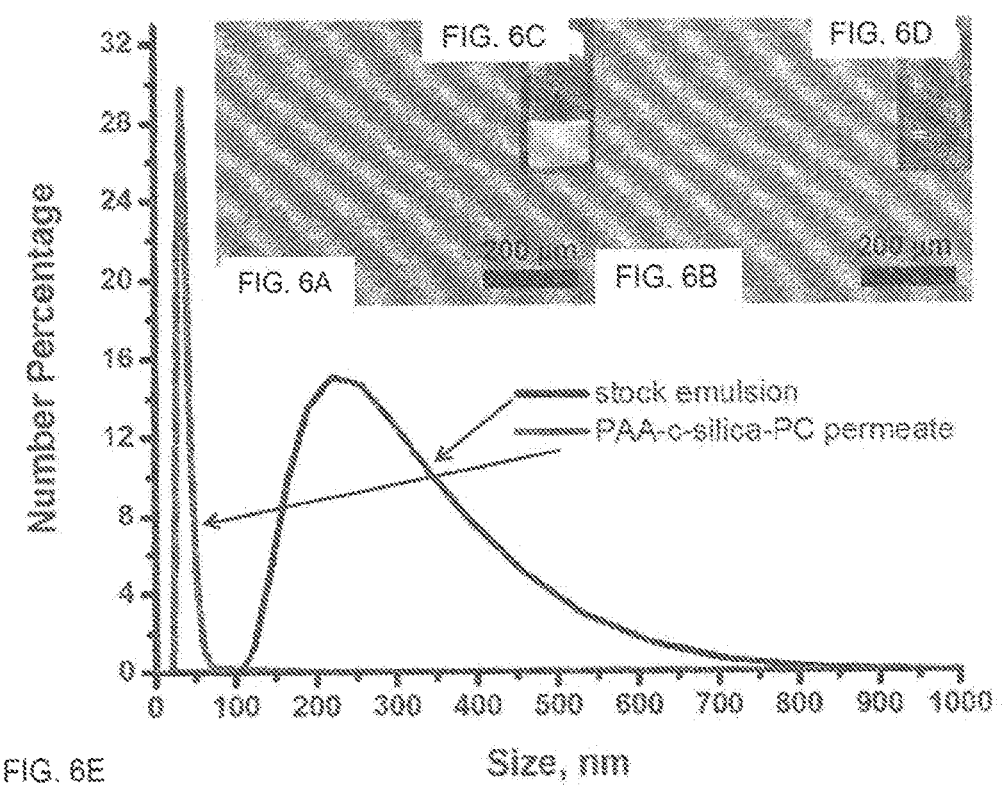

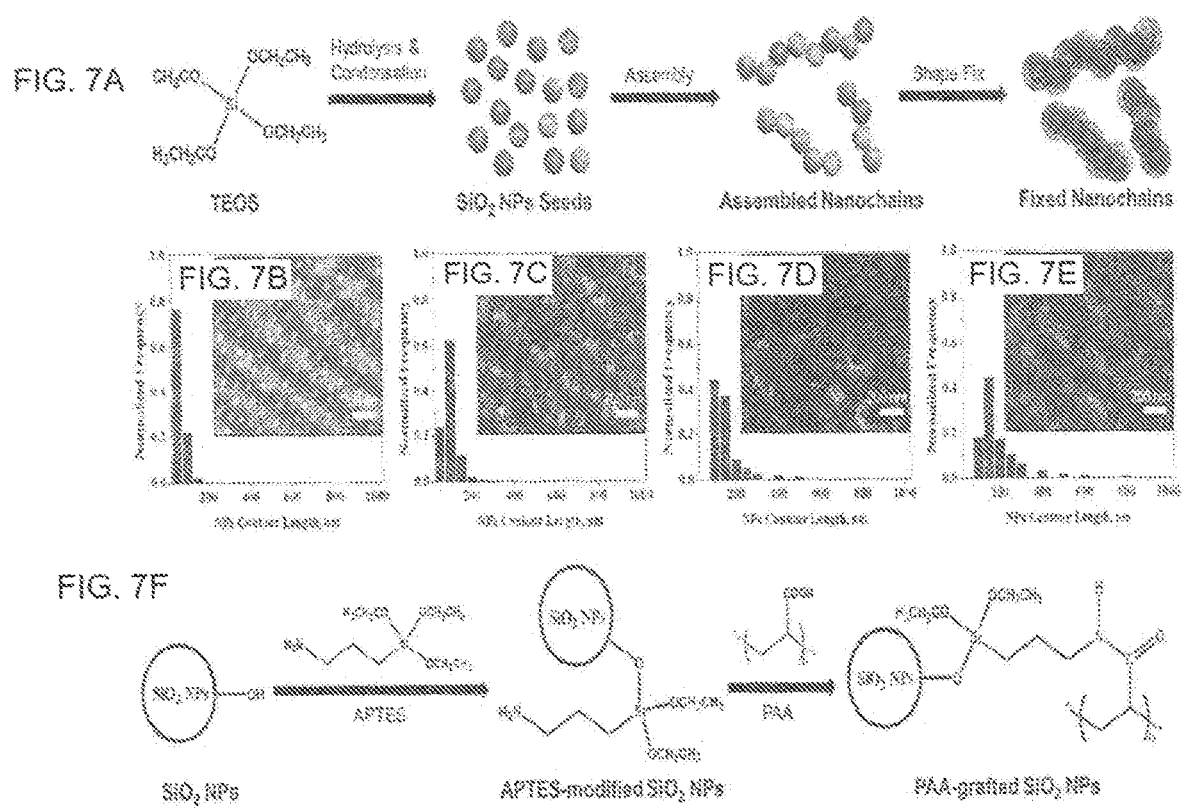

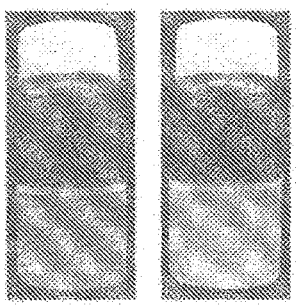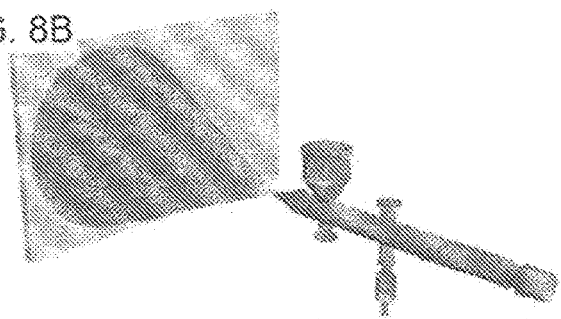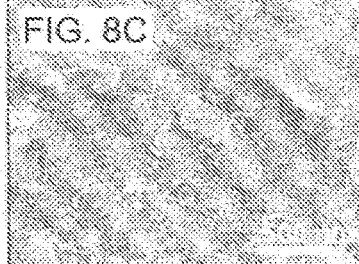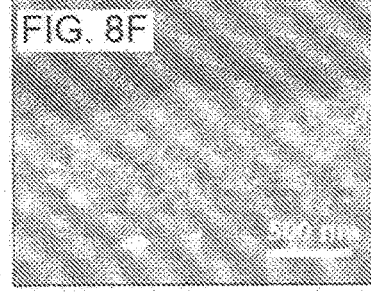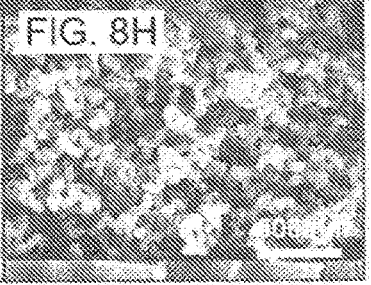

SUPEROLEOPHOBIC MEMBRANES FOR OIL/WATER SEPARATION

CROSS-REFERENCE TO RELATED APPLICATIONS

This application is the National Stage Application of International Patent Application No. PCT/US2017/039652, filed Jun. 28, 2017 which claims the priority of U.S. Provisional Patent Application No. 62/355,817, filed Jun. 28, 2016, which is herein incorporated by reference.

GOVERNMENT RIGHTS

The subject matter disclosed herein was made with government support under grant number CBET-1449337 awarded by the National Science Foundation. The Government has certain rights in the herein disclosed subject matter.

TECHNICAL FIELD

This invention relates to underwater superoleophobic membranes for oil/water separation.

BACKGROUND

Scarcity of fresh water is a global crisis since, each year, there are over 20,000 reported oil spills. In addition to oil contamination, water may be polluted by hydrocarbons, which further contributes to the problem of cleaning the water. This contaminated water, in combination with inappropriate wastewater disposal by industrial plants, generates billions of gallons of wastewater which requires treatment. US regulations generally require water to be cleaned to 10 ppm of oil or less prior to discharge.

Surfactant-stabilized mixtures of oil and water are classified in terms of the diameter (d) of the dispersed phase, as free oil and water if d>150 µm, a dispersion if 20 µm≤d≤150 µm, or an emulsion if d<20 µm. Conventional gravity separators and skimming techniques are incapable of separating emulsions. Membrane-based technologies are attractive for demulsification (the conversion of an emulsion to a free oil-water mixture) because they are relatively energy-efficient, cost-effective, and are applicable across a wide range of industrial effluents. However, for complete oil-water separation, demulsification is typically followed by either gravity separation or skimming.

Membranes are typically classified as either hydrophobic or hydrophilic. Their wettability by oil is often not specified because, in most cases, such membranes are oleophilic, that is, their contact angle with oil is <90°. Hydrophobic (or superhydrophobic) and oleophilic membranes are typically used in energy-intensive cross-flow filtration systems because they are unsuitable for gravity-driven oil-water separation. The conventional separation membranes suffer from the problems such as fouling and dilemma to achieve both high selectivity and permeability at the same time due to the intrinsic trade-off. Nevertheless, they often have low permeability and are not scalable. Further, it is challenging and expensive to separate oil/water emulsion stabilized by surfactants with the dispersed droplet size in the 100 nm scale or smaller. In fact, fabrication of many oil/water separation membranes often is complex or impractical to scale up and commercialize.

There is a need for highly selective oil/water separation membranes with desired wettability, flux, and anti-fouling properties that can be fabricated and used in a scalable and economical fashion.

SUMMARY

In one aspect, compositions comprising anisotropic chain-like silica (Si) nanoparticles (NPs) functionalized with hydrophilic groups are provided. The anisotropic chain-like silica nanoparticles comprise linked arrays of charged silica nanoparticles, each linked array have at least one linear dimension of from about 100 nm to about 1200 nm and the anisotropic chain-like silica nanoparticles each have a diameter of from about 10 nm to about 500 nm. These compositions are superoleophobic in the presence of water, e.g., when submerged in water.

In another aspect, layered coatings adhered to a substrate surface is provided. The layered coating comprises a layer of anisotropic chain-like silica nanoparticles functionalized with hydrophilic groups. The anisotropic chain-like silica nanoparticles comprise linked arrays of charged silica nanoparticles, each linked array has at least one linear dimension of from about 100 nm to about 1200 nm and the anisotropic chain-like silica nanoparticles each have a diameter of from about 10 nm to about 500 nm. The substrate surface comprises surface active moieties carrying a net charge, the anisotropic chain-like silica nanoparticles are held to the surface; and the layered coating conforms to a surface topography defined by the anisotropic chain-like silica nanoparticles on the substrate.

In a further aspect, articles are provided and comprise a layered coating described herein.

In still other aspects, methods of filtering a mixture of water and an oil are provided and comprise (i) contacting a membrane with water; (ii) contacting the membrane of step (i) with a solution comprising the layered coating described herein with the mixture; wherein said water passes through the membrane and less than about 100 ppm of oil passes through the membrane; and (iii) collecting the water passed through said membrane of step (ii). In some embodiments, the membrane is submerged in said water. In other embodiments the methods further comprise (iv) removing oil trapped in the membrane.

In yet further aspects, methods of preparing an superoleophobic coating on a substrate are provided and comprise (a) depositing a layer of anisotropic chain-like silica nanoparticles comprising hydrophilic groups on the substrate; and (b) washing the product of step (b) with water. The anisotropic chain-like silica nanoparticles comprise linked arrays of charged silica nanoparticles, each linked array having at least one linear dimension of from about 100 nm to about 1200 nm and the anisotropic chain-like silica nanoparticles each having a diameter of from about 10 nm to about 500 nm.

In another aspect, superoleophobic articles prepared according to the methods described herein are provided.

Other aspects and embodiments of the invention will be readily apparent from the following detailed description of the invention.

BRIEF DESCRIPTION OF THE DRAWINGS

The present application is further understood when read in conjunction with the appended drawings. For the purpose of illustrating the subject matter, there are shown in the drawings exemplary embodiments of the subject matter; however, the presently disclosed subject matter is not limited to the specific compositions, methods, devices, and systems disclosed. In addition, the drawings are not necessarily drawn to scale.

FIGS. 4A, 4B and 4E are SEM images (scale bar=1 μm) of top views of PAA-c-silica NPs spray coated Si (FIG. 4A), coated PC membrane (FIG. 4C), and non-coated PC membrane surfaces (FIG. 4E). FIG. 4B is a cross-sectional SEM image of PAA-c-silica NPs spray coated Si and FIG. 4D is a cross-sectional SEM image of coated PC membrane.

FIGS. 6A-6D are optical microscope images of stock emulsion (FIG. 6A) and permeate (FIG. 6B) after filtration using coated PC membrane. Visual images of stock emulsion (FIG. 6C) and permeate (FIG. 6D) after filtration using coated PC membrane.

FIG. 6E is a plot showing the DLS results of stock emulsion and permeate after filtration using coated PC membrane. Scale bar=20 μm.

FIG. 7A are schematics of synthesizing $SiO_2$ nanochains. FIGS. 7B-7E are bar graphs showing the size distribution in terms of contour length of $SiO_2$ nanochains and SEM images of synthesized $SiO_2$ nanochains with the seeds to water ratio of 0.33, 0.56, 0.6, and 1.

FIG. 7F are schematics of grafting PAA onto $SiO_2$ nanochains.

FIG. 8A are images of 0.25 wt % of $SiO_2$ nanochain (left) and PAA grafted $SiO_2$ nanochain (right) dispersed in ethanol. FIG. 8B is a spray coating schematic. FIGS. 8C-8H are SEM images of top view (C-D) and cross-section (F-H) of spherical $SiO_2$ NPs coating, $SiO_2$ nanochain coating, and PAA grafted $SiO_2$ nanochain coating.

DETAILED DESCRIPTION OF ILLUSTRATIVE EMBODIMENTS

Figure 1:
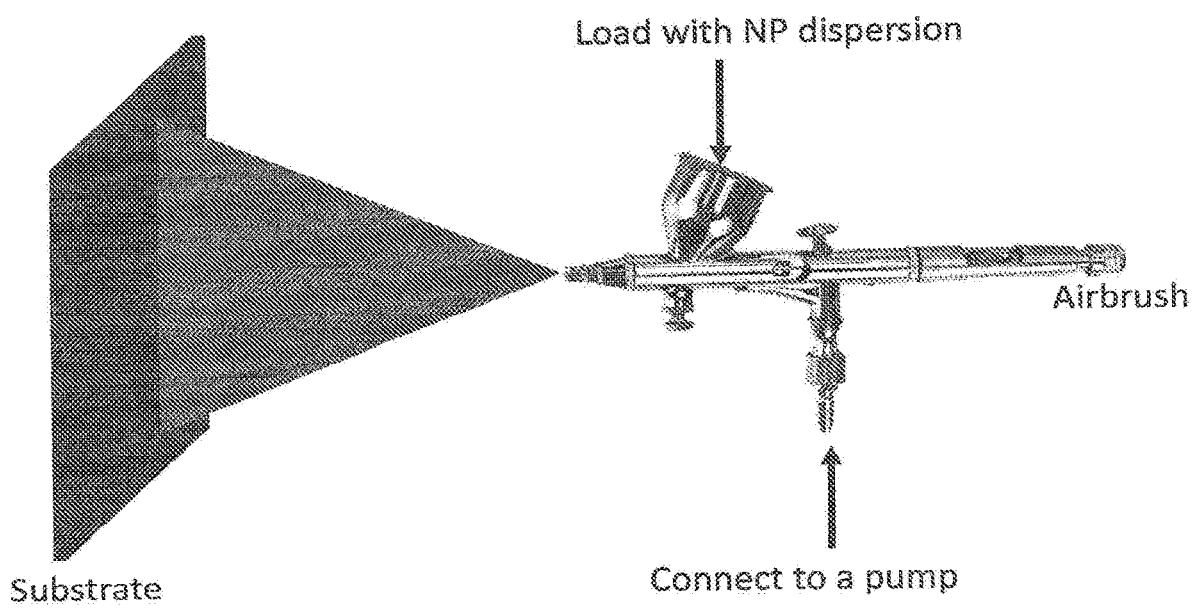
FIG. 1 is a schematic illustration of a spray coating of the nanoparticles described herein onto a substrate.

As described herein, compositions and methods are provided which achieve a tailorable hierarchal porosity/roughness engineered structure of a coating applied to a substrate that results in a membrane capable of oil/water separation. The nanoparticles were designed to be superoleophobic by modifying them with hydrophilic groups, thereby assembling into fractal-like thin coatings with nanoporosity. The term "fractal-like" as used herein refers to a coating having a repeating pattern.

The nanoparticles are capable of stacking on each other and assemble to coatings with nano-porosity and nano-roughness when applied to a conventional substrate. The resulting hierarchical structure has good selectivity without compromising permeability. The inventors hypothesize that these advantageous properties may be due to the nanoparticles' unique chain-like morphology and/or the interconnected nano-sized pores.

The substrates coated with the compositions described herein overcome challenges in the art. Specifically, the coated substrates are designed to control substrate surface chemistry and structures. Unexpectedly, even after the substrate surface coated with the nanoparticles was wet by oil in air, the underwater superoleophobicity may be fully recovered in water. Further, such coatings retain hydrophilicity in water, as opposed to the superoleophobic compositions known in the art. The coated substrates and methods of using them are scalable, economical, versatile, and may be applied to any surface to achieve superoleophobicity. Furthermore, the nanoparticle compositions described herein have an increased affinity to water and excellent oil repellency underwater.

The term "superoleophobic" as used herein refers to the ability of the compositions described herein to repel oil or repel from oil. In some embodiments, the compositions are superoleophobic in the presence of water. In other embodiments, the compositions are superoleophobic when submerged in water. Similarly, the term "superoleophobic" refers to superoleophobic nanoparticles which have contact angles of hexadecane and dichloroethane in water of at least about 150° and a contact angle hysteresis (the difference between advancing and receding angles) or the tilt angle less than about 4° as determined by a goniometer of tilting device, or combinations thereof.

In the present disclosure the singular forms "a", "an" and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about" or "substantially" it will be understood that the particular value forms another embodiment. In general, use of the term "about" or "substantially" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about" or "substantially". In other cases, the gradations used in a series of values may be used to determine the intended range available to the term "about" or "substantially" for each value. Where present, all ranges are inclusive and combinable. That is, references to values stated in ranges include every value within that range.

When a list is presented, unless stated otherwise, it is to be understood that each individual element of that list and every combination of that list is to be interpreted as a separate embodiment. For example, a list of embodiments presented as "A, B, or C" is to be interpreted as including the embodiments, "A," "B," "C," "A or B," "A or C," "B or C," or "A, B, or C."

It is to be appreciated that certain features of the invention which are, for clarity, described herein in the context of separate embodiments, may also be provided in combination in a single embodiment. That is, unless obviously incompatible or excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Finally, while an embodiment may be described as part of a series of steps or part of a more general structure, each said step may also be considered an independent embodiment in itself.

I. The Composition

The composition comprises anisotropic chain-like silica nanoparticles functionalized with hydrophilic groups. As used herein, "anisotropic chain-like silica nanoparticles" refer to linear arrays, branched arrays, or combinations thereof of contiguous and linked charged silica nanoparticles, typically, but not necessarily, each "chain" having a diameter and an overall length. In some embodiments, the linked arrays of silica nanoparticles are linear arrays. In other embodiments, the silica nanoparticles are branched arrays. In further embodiments, the silica nanoparticles comprise linked and branched arrays. It is the anisotropic chain-like silica nanoparticles that, when applied as a coating, define a surface topography.

The size of each chain or array is selected such that it provides superoleophobic properties to the nanoparticles discussed herein when contacted with water. In some embodiments, each chain contains about 4 to about 20 silica nanoparticles. In other embodiments, each chain contains about 5 to about 19, about 6 to about 18, about 7 to about 17, about 8 to about 16, about 9 to about 15, about 10 to about 14, or about 11 to about 13 silica nanoparticles. In further embodiments, the nanoparticles have a number of silica nanoparticles within these ranges.

The term "nanoparticle" refers to a particle having at least one dimension in the nanoscale dimension, i.e., a mean diameter, of about 10 nm to about 500 nm. The terms "mean diameter" or "mean cross-sectional dimension" refers to the arithmetic average of the lengths of the major and minor axes of the particles. However, certain embodiments contemplate a narrower particle size range. That is, in certain embodiments, the nanoparticles have a mean diameter of about 20 nm to about 100 nm. In some embodiments, the nanoparticles have a mean diameter of about 30 to about 70 nm. In other embodiments, the nanoparticles have a mean diameter of about 40 to about 50 nm. In other embodiments, the nanoparticles have a mean cross-sectional dimension within these ranges.

The nanoparticle also has an overall length of about 100 to about 1200 nm. In some embodiments, the nanoparticle has an overall length of about 100 to about 1100 nm, about 100 to about 1000 nm, about 100 to about 900 nm, about 100 to about 800 nm, about 100 to about 700 nm, about 100 to about 600 nm, about 100 to about 500 nm, about 100 to about 400 nm, about 100 to about 300 nm, or about 100 to about 200 nm. In other embodiments, the overall length of the nanoparticle is about 100 to about 800 nm, about 110 to about 790 nm, about 120 to about 180 nm, about 130 nm to about 780 nm, about 150 nm to about 770 nm, about 160 to about 760 nm, about 170 to about 750 nm, about 180 to about 740 nm, about 190 to about 730 nm, about 200 to about 720 nm, or about 210 to about 710 nm. In further embodiments, the overall length of the nanoparticle is about 200 to about 320 nm, about 210 to about 310 nm, about 220 to about 300 nm, about 230 to about 290 nm, about 240 to about 280, about 250 to about 270 nm. In further embodiments, the overall length of the nanoparticle is about 260 nm. In other embodiments, the nanoparticles have an overall length within these ranges.

The nanoparticles making up the anisotropic chain-like silica nanoparticles are substantially spherical. To the extent that a given particle or population of particles deviates from a purely spherical shape, such that each particle can be described as having a major and minor axis, the present application includes embodiments wherein the ratio of the lengths of the major and minor axis of each particle can be about 2, less than 2, less than 1.5, less than 1.3, less than 1.2 or less, less than 1.1, or less than 1.05 or less than 1.02, for example, to 1. The term "substantially spherical" refers to a shape wherein the ratio of major/minor axis less than 1.1. Similarly, where the particles are other than purely spherical, the term "mean diameter" or "mean cross-sectional dimension" refers to the arithmetic average of the lengths of the major and minor axes of the particles.

The silica nanoparticles described herein derive their superoleophobic properties to functionalization with hydrophilic groups. The term "hydrophilic" refers to chemical moieties/substrates that have an affinity to water, i.e., a strong interaction with water. In some embodiments, a hydrophilic surface has a water contact angle of about 90° or less, i.e., about 80°, 70°, 60°, 50°, 40°, 30°, 20°, or 10°. In other embodiments, the hydrophilic surface has a contact angle range within these angles.

In some embodiments, the hydrophilic groups are directly bound to the silica nanoparticles, i.e., are pendant groups. In other embodiments, hydrophilic groups are attached to a polymer, which is itself bound to the silica nanoparticles.

The hydrophilic groups may be negatively charged, positively charged, or zwitterionic. In some embodiments, the hydrophilic groups are negatively charged. The negatively charged hydrophilic groups comprise hydroxyls, carbonyls, carboxyls, sulfonates, phosphates, ethers, esters, phosphodiesters, glycolytic linkages, peptides, or combinations thereof. In some embodiments the ester is a fat such as a triglyceride. In other embodiments, the hydrophilic group is a phosphodiester such as a nucleic acid. In further embodiments, the hydrophilic group is a glycolytic linkage such as a disaccharide, polysaccharide, or combination thereof. In yet other embodiments, the hydrophilic group comprises a peptide such as a polypeptide, protein, or combination thereof. In still further embodiments, the hydrophilic group comprises a carboxyl group such as a carboxylic acid such as those found in amino acids, amino acid side chains, and/or fatty acid heads. In other embodiments the hydrophilic group is poly(acrylic acid).

The hydrophilic groups may also be positively charged. In some embodiments, the positively charged hydrophilic groups comprise amino groups.

The hydrophilic groups may also contain both negatively and positively charged groups in the same composition, i.e., are zwitterionic. In some embodiments, the zwitterion comprises a basic secondary amine or tertiary amine fragment together with a carboxylic acid fragment such as an amino acid, bicine, tricine. In other embodiments, the zwitterion is an alkaloid such as LSD or psilocybin. In further embodiments, the zwitterion is a quaternary ammonium cation such as a betaine. In yet other embodiments, the zwitterion is a phospholipid, or combination thereof.

II. The Layered Coatings

Also provided herein are layered coatings adhered to a substrate, the layered coating comprising a layer of anisotropic chain-like silica nanoparticles functionalized with hydrophilic groups as described above. In some embodiments, the coating comprises one or more layers of the nanoparticles. In other embodiments, the coating is a monolayer of nanoparticles.

The surface of the substrate comprises surface active moieties carrying a net charge and permit association of the hydrophilic groups to the substrate. The particular charge of the substrate depends on the hydrophilic groups of the silica nanoparticles. In some embodiments, the net charge of the substrate is the opposite charge from the hydrophilic group. In other embodiments, the net charge of the substrate is the same or similar to the charge from the hydrophilic group. In further embodiments, the anisotropic chain-like silica nanoparticles are held to the substrate surface via electronic interactions, hydrogen bonding, Van der Waal forces, covalent bonding, or combinations thereof. The anisotropic silica nanoparticles may also become entangled with the substrate via the hydrophilic groups. Accordingly, the substrate may be negatively charged, positively charged, or zwitterionic.

The anisotropic chain-like silica nanoparticles are "worm-like" and, as noted above, are formed by contiguous and linked spherical nanoparticles. In doing so, each array or chain has a broad distribution of chain-lengths. Although the layered coatings described herein do not contain high "pillars" in the coatings, they are sufficiently rough. The layered coating conforms to a surface topography defined by the anisotropic chain-like silica nanoparticles on the substrate. In some embodiments, the topography of the layered coating is roughness. In further embodiments, the roughness is from about 20 to about 200 nm, about 30 to about 190 nm, about 40 to about 180 nm, about 50 to about 170 nm, about 60 to about 160 nm, about 70 to about 150 nm, about 80 to about 140 nm, about 90 to about 130 nm, or about 100 to about 120 nm. In one embodiment, the roughness of the layered coating is about 20 to about 200 nm. The roughness of the coating may be determined using skill in the art and atomic force microscope. As known in the art, "roughness" is calculated as root-mean-square (RMS) roughness. By way of example, in the nanoparticle layered coating described herein, the RMS roughness is about 40 to about 60 nm.

The layered coating also is porous, so as to permit passage of water through the substrate. In some embodiments, the layer coatings have nano-porosity. In other embodiments, the porosity of said coating is at least about 30 vol % (ratio of volume of the void space to total volume), about 35 vol %, about 36 vol %, about 40 vol %, about 50 vol %, about 60 vol %, about 70 vol %, about 80 vol %, or about 90 vol %.

The layered coating may be any thickness which permits passage of water through the coating, prevents the passage of oil through the coating, or combinations thereof. However, the coating is sufficiently thick so as to prevent the formation of defects on the coating. In some embodiments, the coating is ultrathin, but still maintains its roughness over the substrate. In further embodiments the layer coating is thin and, in doing, a higher flux is achieved when used in filtration methods. In other embodiments, the thickness of the layered coating is about 100 nm or less. In still further embodiments, the thickness of the layered coating is about 100 nm to about 10 µm. In further embodiments, the thickness of the layered coating is about 200 nm to about 1 µm, about 300 nm to about 900 nm, about 400 nm to about 800 nm, or about 500 nm to about 700 nm. In yet other embodiments, the thickness of the coating is about 1 µm. In another embodiment, the layered coating has a thickness of about 50 nm.

Suitable substrates useful as described herein are those that are stable when submerged in water. The term "stable" as used to describe the substrate refers to the ability of the substrate to remain in its original form. Desirably, the substrate does not fall apart/disintegrate in water. In some embodiments, the substrate comprises plastics/polymer, fabrics, inorganic membranes, inorganic metal meshes, metals, or combinations thereof. In other embodiments, the substrate is a plastic/polymer such as a polyester, polystyrene, poly(methylmethacrylate), polycarbonate, cellulose acetate, poly(sulfonate), or a combination thereof. Virtually any material may serve as a substrate and users of ordinary skill in the art will encounter little difficulty in identifying suitable substrate materials.

One or more parts of the substrate may be porous. The term "porous" as used to describe the substrate refers to the ability of a liquid to pass through the substrate. In some embodiments, the substrate has a porosity of from about 10 to about 80 vol %, about 13 to about 78 vol %, about 15 to about 75 vol %, about 20 to about 70 vol %, about 30 to about 60 vol %, about 40 to about 50 vol %. The substrate may further have a pore diameter of about 2, 1.9, 1.8, 1.7, 1.6, 1.5, 1.4, 1.3, 1.2, 1.1, 1, 0.9, 0.8, 0.7, 0.6, 0.5, 0.4, 0.3, 0.2, or 0.1 µm or less.

The substrates may be of any size that permits application of the anisotropic chain-like silica nanoparticles. The substrates may be small or large, depending on the article to be fabricated. Despite the difficulties in the art with layered coating larger substrates using other methods and substrates, larger substrates may be coated due to simplicity of the coating method discussed herein.

The layer of anisotropic chain-like silica nanoparticles as described above are deposited onto the substrate. The nanoparticles may be deposited on the substrate via a variety of techniques, including spray-coating, dip-coating, flow-coating, drop-casting, or slot-coating. The substrate is suitably contacted with the nanoparticle solution for time sufficient to permit the nanoparticles to adhere onto the substrate with sufficient stability. In one embodiment, the substrate is contacted with the nanoparticle solution for at least about 1 minute. In some embodiments, the substrate is contacted with the nanoparticles solution for at least about 2 minutes.

The concentration of anisotropic chain-like silica nanoparticles is about 0.05 to about 1 wt %. In one embodiment, the concentration of anisotropic chain-like silica nanoparticles is about 0.1 to about 0.7 wt %. In a further embodiment, the concentration of anisotropic chain-like silica nanoparticles is about 0.5 wt %.

One of skill in the art would readily be able to monitor the coating and utilize further laboratory techniques to complete the coating. Specifically, one or more steps noted herein may be performed by one skilled in the art at elevated temperatures, reduced pressures, varying humidities (using, e.g., a desiccator), deposition speed, composition concentration, drying at lower or higher temperatures in the absence or presence of stirring, centrifugation, sonication, and pH, among others. In one embodiment, the pH of the coating process is maintained. In one embodiment, the pH is maintained at about 4 to about 12. In a further embodiment, the pH is about 5.5 to about 6.5. In another embodiment, the pH is about 6.

The substrate may be pre-wetted with water before depositing the composition. It is hypothesized that water binds to a membrane surface and fills the channels of the membrane to provide an environment mimicking that found underwater. Accordingly, when the nanoparticle composition is deposited, the water molecules in the nanoparticle composition continuously binds to the membrane or forms a continuous phase with the water in the channels, which then permeates through the membrane.

The anisotropic chain-like silica nanoparticles may be applied to the substrate in the presence of water, a solvent, a catalyst, or both. In some embodiments, the nanoparticles are applied in the presence of water. In other embodiments, the solvent is a water-miscible organic solvent. In a further embodiment, the solvent is a lower alcohol, water, or any combination thereof. Lower alcohols include those alcohols having four or fewer carbons and include, but are not limited to, methanol, ethanol, propanol, isopropanol, butanol, n-butanol, isobutanol, sec-butanol, and tert-butanol.

III. Articles

Also provided herein are superoleophobic articles. These articles include a substrate that is at least partially coated with the anisotropic chain-like silica nanoparticles described herein. In one embodiment, a portion of the substrate is coated with the layered coating described herein. In another embodiment, substantially all of the substrate is coated with the layered coating described herein. In a further embodiment, the entire substrate is coated with the layered coating described herein.

In one embodiment, an article is provided and comprises a layered coating described herein.

In another embodiment, an article may be prepared according to the methods described herein. Desirably, the article is superoleophobic.

IV. Methods of Using the Compositions/Coatings/Articles

The compositions, coatings, or articles described herein have wide reaching applications. Advantageously, the use of the compositions described herein may be used underwater. In some embodiments, the compositions, coatings, and articles may be used in filtration methods. The filtration methods include the separation of a liquid from a solid or the separation of two liquids. In other embodiments, the filtration methods permit the separation of oil and water.

Accordingly, the compositions, coatings or articles are useful in methods of treating wastewaters optionally containing a surfactant. In some embodiments, the present disclosure provides methods of cleaning oil spills in water, such as seawater contaminated with oil, fracking wastewater, household wastewater (which contains oil, detergents, surfactants, or combinations thereof), chemical plant wastewater, oil refinery wastewater, and research lab facility wastewater, among others. In some embodiments, the present disclosure thereby provides methods of filtering a mixture of water and an oil. Such methods are also useful in separating oil and water emulsions.

The term "emulsion" as used herein refers to a mixture of two of more liquids, where one liquid is dispersed in another liquid. In some embodiments, the emulsion is contains water and oil to form an oil-in-water emulsion, wherein the oil is the dispersed phase and water is the dispersion medium or a water-in-oil emulsion, wherein water is the dispersed phase and oil is the external phase. In some embodiments, the emulsion comprises droplets of at least about 100 nm, 200 nm, 300 nm, 400 nm, 500 nm, 600 nm, 700 nm, 800 nm, 900 nm or 1000 nm in diameter. In other embodiments, the droplets are about 200 to about 300 nm in diameter.

The methods include passing water through a membrane coated with the compositions described herein. In some embodiments, the membrane is submerged in the water mixture. In other embodiments, the membrane is dry and the water mixture is poured onto the membrane. A variety of techniques may be used to promote the passage of the water mixture through the membrane. Such techniques include, without limitation, dead-end filtration, cross-flow filtration, gravity filtration, or pressure induced filtration, or combinations thereof.

When filtering a mixture of water and oil, most of the water and only a small amount of the oil permeates the membrane. In some embodiments, at least about 90 vol %, 91 vol %, 92 vol %, 93 vol %, 94 vol %, 95 vol %, 96 vol %, 97 vol %, 98 vol %, or 99 vol % of the water passes through the membrane. In other embodiments, less than about 100 ppm, 90 ppm, 80 ppm, 70 ppm, 60 ppm, or 50 ppm of oil passes through the membrane.

Also provided are methods for removing substances that become trapped in the coated substrate. In some embodiments, the methods provide for removing oil that may become trapped in the coated membrane when it is dry or wet. When oil is trapped in a dried membrane, the olephobicity of the membrane may be restored by adding water to the membrane or submerging the membrane in water.

If oil becomes trapped in a membrane submerged in water, the superoleophobicity of the coating may be restored. It is hypothesized that some of the hydrophilic groups may lose their hydrophilicity during the filtration process. Accordingly, restoring their hydrophilicity restores the superoleophobic properties of the coating in water. In some embodiments, the hydrophilicity of the hydrophilic groups is restored by changing the pH of the water mixture. In other embodiments, the pH of the water mixture may be raised to at least about 10. In further embodiments, the pH of the water mixture may be lowered to at least about 2.

V. Embodiments

Embodiment 1

A composition comprising anisotropic chain-like silica nanoparticles functionalized with hydrophilic groups;

said anisotropic chain-like silica nanoparticles comprising linked arrays of charged silica nanoparticles, each linked array having at least one linear dimension of from about 100 nm to about 1200 nm and said anisotropic chain-like silica nanoparticles each having a diameter of from about 10 nm to about 500 nm.

Embodiment 2

The composition of Embodiment 1, which is superoleophobic in the presence of water.

Embodiment 3

The composition of Embodiment 1 or 2, which is superoleophobic when submerged in water.

Embodiment 4

The composition of any one of the preceding Embodiments, wherein said hydrophilic groups are negatively charged.

Embodiment 5

The composition of Embodiment 1, wherein said hydrophilic groups comprise hydroxyls, carbonyls, carboxyls, sulfonates, phosphates, ethers, esters, phosphodiesters, glycolytic linkages, peptide bonds, or combinations thereof.

Embodiment 6

The composition of Embodiment 5, wherein said phosphodiester linkage comprises a nucleic acid.

Embodiment 7

The composition of Embodiment 5, wherein said glycolytic linkage comprises a disaccharide, polysaccharide, or combination thereof.

Embodiment 8

The composition of Embodiment 5, wherein said peptide comprises a polypeptide, protein, or combination thereof.

Embodiment 9

The composition of Embodiment 4, wherein said carboxyl groups are carboxylic acids.

Embodiment 10

The composition of any one of Embodiments 1 to 3, wherein said hydrophilic groups are positively charged.

Embodiment 11

The composition of Embodiment 10, wherein said hydrophilic groups comprise amino groups.

Embodiment 12

The composition of any one of Embodiments 1 to 3, wherein said hydrophilic groups are zwitterions.

Embodiment 13

The composition of Embodiment 12, wherein said zwitterion comprises an amino acid, bicine, tricine, alkaloid, quaternary ammonium cation, phospholipid, or combination thereof.

Embodiment 14

The composition of Embodiment 1, wherein said silica nanoparticles are negatively charged.

Embodiment 15

The composition of Embodiment 1, wherein the at least one linear dimension of from about 130 nm to about 780 nm.

Embodiment 16

The composition of Embodiment 1 wherein the at least one linear dimension is about 260 nm.

Embodiment 17

The composition of Embodiment 1, wherein the average cross sectional dimension of at least one silica nanoparticle is from about 40 to about 50 nm.

Embodiment 18

The composition of Embodiment 1, wherein the linked arrays of charged silica nanoparticles are branched.

Embodiment 19

The composition of Embodiment 1, comprising about 4 to about 20 charged silica nanoparticles per linked array.

Embodiment 20

A layered coating adhered to a substrate surface, the layered coating comprising a layer of anisotropic chain-like silica nanoparticles functionalized with hydrophilic groups, wherein:
said anisotropic chain-like silica nanoparticles comprising linked arrays of charged silica nanoparticles, each linked array having at least one linear dimension of from about 100 nm to about 1200 nm and said anisotropic chain-like silica nanoparticles each having a diameter of from about 10 nm to about 500 nm;
the substrate surface comprises surface active moieties carrying a net charge;
said anisotropic chain-like silica nanoparticles are held to said surface; and
said layered coating conforms to a surface topography defined by the anisotropic chain-like silica nanoparticles on the substrate.

Embodiment 21

The layered coating of Embodiment 20, wherein said substrate is porous.

Embodiment 22

The layered coating of Embodiment 21, wherein said substrate has a porosity of from about 10 to about 80 vol %.

Embodiment 23

The layered coating of Embodiment 20, wherein the pore diameter of the substrate is less than about 2 µm.

Embodiment 24

The layered coating of Embodiment 20, wherein said substrate is a plastic, fabric, inorganic membrane, inorganic metal mesh, or combinations thereof.

Embodiment 25

The layered coating of Embodiment 24, wherein said plastic is a polyester, polystyrene, poly(methyl methacrylate), poly(carbonate), or combination thereof.

Embodiment 26

The layered coating of Embodiment 20, wherein said topography is roughness.

Embodiment 27

The layered coating of Embodiment 26, wherein said roughness is from about 20 to about 200 nm.

Embodiment 28

The layered coating of Embodiment 20, wherein said coating is porous.

Embodiment 29

The layered coating of Embodiment 28, wherein the porosity of said coating is at least about 36%.

Embodiment 30

The layered coating of Embodiment 20, which has a thickness of about 100 nm to about 10 μm.

Embodiment 31

An article comprising a layered coating of any one of Embodiments 20 to 30.

Embodiment 32

A method of filtering a mixture of water and an oil, comprising:
(i) contacting a membrane with water;
(ii) contacting the membrane of step (i) with a solution comprising the layered coating of any one of Embodiments 12 to 22 with said mixture;
wherein said water passes through said membrane and less than about 100 ppm of oil passes through said membrane; and
(iii) collecting said water passed through said membrane of step (ii).

Embodiment 33

The method of Embodiment 32, wherein said water passes through said membrane using dead-end filtration, cross-flow filtration, gravity filtration, or pressure induced filtration, or combinations thereof.

Embodiment 34

The method of Embodiment 32, wherein said membrane is submerged in said water.

Embodiment 35

The method of Embodiment 32, further comprising (iv) removing oil trapped in said layered coating membrane.

Embodiment 36

The method of Embodiment 32, comprising changing the pH of the solution membrane.

Embodiment 37

The method of Embodiment 36, wherein hydrophilicity of said groups is restored.

Embodiment 38

The method of Embodiment 36, wherein the pH is raised to about 10.

Embodiment 39

The method of Embodiment 36, wherein the pH is lowered to 2.

Embodiment 40

The method of Embodiment 32, wherein said solution comprises seawater contaminated with oil.

Embodiment 41

The method of Embodiment 32, wherein said solution comprises fracking wastewater.

Embodiment 42

The method of Embodiment 32, wherein said mixture comprises a surfactant.

Embodiment 43

The method of Embodiment 32, wherein said mixture is an emulsion.

Embodiment 44

The method of Embodiment 43, wherein said emulsion comprises droplets of at least about 100 nm in diameter.

Embodiment 45

The method of Embodiment 44, wherein said droplets are about 200 to about 300 nm in diameter.

Embodiment 46

A method of preparing an superoleophobic coating on a substrate, comprising:
(a) depositing a layer of anisotropic chain-like silica nanoparticles comprising hydrophilic groups on said substrate; and
(b) washing the product of step (b) with water, wherein:
said anisotropic chain-like silica nanoparticles comprising linked arrays of charged silica nanoparticles, each linked array having at least one linear dimension of from about 100 nm to about 1200 nm and said anisotropic chain-like silica nanoparticles each having a diameter of from about 10 nm to about 500 nm; and
said layered coating conforms to a surface topography defined by the anisotropic chain-like silica nanoparticles on the substrate.

Embodiment 47

The method of Embodiment 46, wherein step (a) is performed using spray coating, dip coating, slot coating, flow coating, or combinations thereof.

Embodiment 48

An superoleophobic article prepared according to the method of Embodiment 46 or 47.

The following Examples are provided to illustrate some of the concepts described within this disclosure. While each Example is considered to provide specific individual embodiments of composition, methods of preparation and use, none of the Examples should be considered to limit the more general embodiments described herein.

In the following examples, efforts have been made to ensure accuracy with respect to numbers used (e.g. amounts, temperature, etc.) but some experimental error and deviation should be accounted for. Unless indicated otherwise, temperature is in degrees C., pressure is at or near atmospheric.

EXAMPLES

Materials:

L-arginine (reagent grade, ≥98%), tetraethyl orthosilicate (99.999% trace metals basis), (3-aminopropyl)triethoxysilane (≥98%), poly(acrylic acid) (99%), dimethylformamide (anhydrous, 99.8%), hexadecane (ReagentPlus®, 99%), and Whatman® Nuclepore™ Track-Etched Membranes (diam. 47 mm, pore size 1 μm, polycarbonate) were purchased from Sigma-Aldrich and used as received. Ethanol (200 proof) was purchased from Fisher Scientific and used as received.

Example 1: Synthesis of Chain-Like Silica Nanoparticles

The synthesis of chain-like silica nanoparticles (NPs) consists of 3 steps, which are making the seeds, growing the chains, and fixing the shapes. For making the seeds, 0.06 g of 1-arginine was added to the mixture of 40.45 g of deionized water (DI water) and 4.2 g of tetraethyl orthosilicate (TEOS). The mixture was stirred mildly at 60° C. overnight. To grow the chain, 0.26 g of 1-arginine was added to the mixture of 8 g of seeds solution from the first step, 8 g of DI water, and 64 g of ethanol. The mixture was kept at 60° C. without stirring overnight. For finalizing the chain shape, 1 g of TEOS was added to the resulting mixture from second step and the new mixture was stirred moderately at 60° C. overnight. The product after step 3 was centrifuged at 7500 rpm for 45 min and the precipitate was kept and re-dispersed in DI water by sonication. This process was repeated 3 times. The remaining solid was dried in air. The synthesized NPs were characterized by using scanning electron microscopy (SEM).

Example 2: Grafting of Polymer Brushes

Graft-to method was used to graft poly(acrylic acid) (PAA) onto the chain-like silica NPs. First, 0.2 g of chain-like silica NPs was dispersed into the mixture of 3.5 mL of DI water and 40 mL of ethanol. Followed by adding 110 μL of (3-aminopropyl)triethoxysilane (APTES), the mixture was kept at 68° C. with reflux overnight with moderate stirring. The product was centrifuged and the remaining solid was re-dispersed in ethanol. The process was repeated 3 times and the final remaining solid was re-dispersed in the mixture of 40 mL of dimethylformamide (DMF) and 0.3 g of PAA by sonication. The final mixture was heated to 140° C. with reflux overnight with moderate stirring. The product after the reaction was washed with ethanol and DI water (by centrifuging and re-dispersing) 3 times before drying in air. The resulting PAA grafted silica NPs were characterized using Fourier transform inferred spectroscopy (FT-IR).

Example 3: Coating of NPs on Substrates

For coating the PAA grafted chain-like silica NPs (PAA-c-silica NPs) onto a substrate, the dried NPs was first dispersed in ethanol by sonication to prepare the NPs dispersion. The 0.25 wt % NPs dispersion was loaded into an airbrush which was connected to an air pump (FIG. 1), and then sprayed at a pressure of 20 psi onto a substrate that was at a distance of 10 cm away from the airbrush tip until the loaded NP dispersion was completely sprayed. The thickness of the coating was controlled by the loading volume of the NP dispersion and the surface area of the substrate. The substrates used in the experiment were silicon (Si) wafer and polycarbonate (PC) membranes (1 μm pore size) which were used for testing the underwater superoleophobicity and separation of oil-in-water emulsions, respectively. The resulting surface morphology from the coating was characterized by SEM.

Example 4: Testing of Underwater Superoleophobicity

Si wafers coated with PAA-c-silica NPs were used to test the underwater superoleophobicity of the coating. There were two types of tests that were conducted, including water wetted state and the recovery from the oil wetted dried state. For testing underwater superoleophobicity of the coating under wetted state, the substrate was first immersed into a small glass tank filled with DI water. A pendant drop of 4 μL of dichloroethane (DCE) was then dispensed by a needle and hung on the top of the substrate underwater. To test the adhesion between the DCE and the substrate surface, the substrate was raised to touch the DCE pendent drop to see if the DCE can adhere to the substrate surface. Afterwards, the DCE droplet was released onto the substrate and its oil contact angle in water (OCA-W) was measured by a goniometer. For testing underwater superoleophobicity of the coating under dried state, the substrate was first dried in air and then immersed into a container filled with DCE for 30 s. After that, the DCE wetted substrate was immersed into the glass tank filled with DI water. The goniometer was used to capture the wetting behaviors at various stages. The uncoated Si wafer was used as the control for comparison.

Example 5: Oil-in-Water Emulsions

I. Preparation of Oil-in-Water Emulsions

The oil-in-water emulsion was prepared by sonicating the mixture of 1 vol % of hexadecane and 99 vol % of DI water with 0.5 mg/mL of sodium dodecyl sulfate (SDS) as the surfactant. The resulting emulsion was used as the stock solution for the filtration and its oil droplet size was characterized by optical microscopy and dynamic light scattering (DLS).

II. Separation of Oil-in-Water Emulsions

Figure 2:
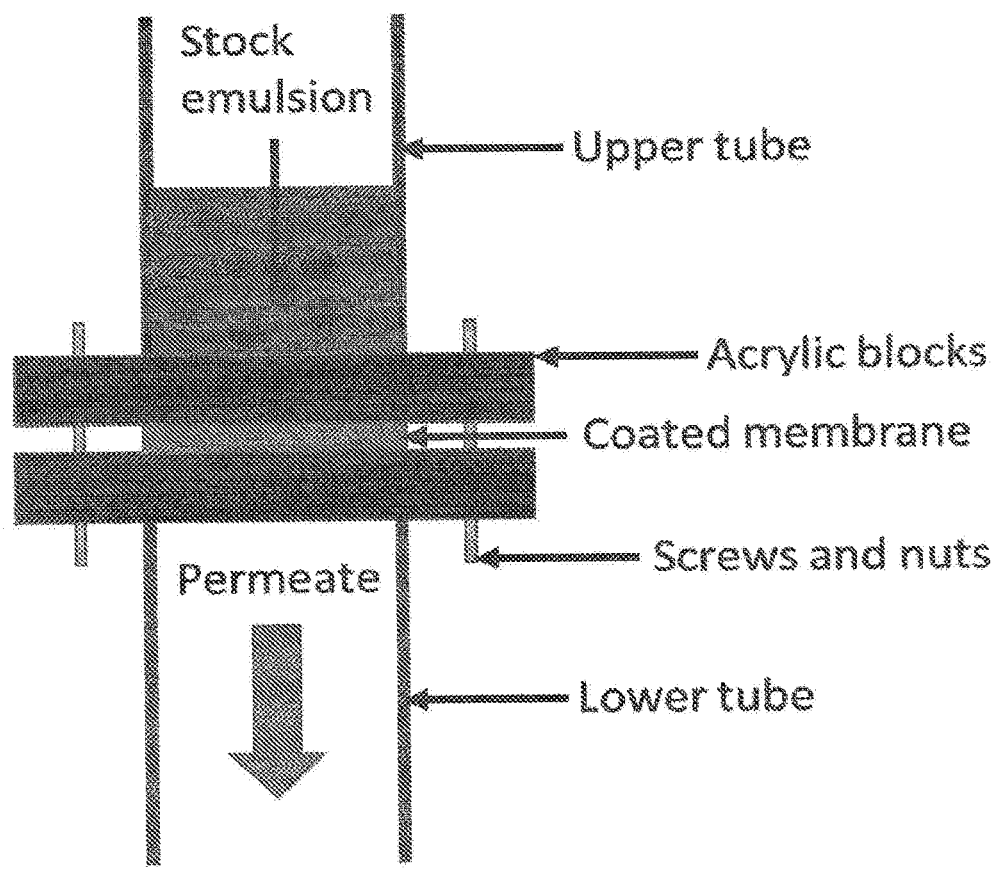
FIG. 2 are schematics illustrating the separation of oil-in-water emulsions using a filtration device and the coated PC membranes.

A filtration device and the coated PC membrane were used to test the separation of oil-in-water emulsion. As shown in FIG. 2, two acrylic blocks with a 1-inch cylindrical hole cut-out were used to fix and seal the coated membrane in-between. Both the upper block and lower block were connected by a quartz tube for storing the stock emulsion and guiding the permeate to the collector during the filtration. All the connecting points were sealed using O-rings. The separation starts by pouring the stock emulsion into the upper tube. The resulting permeate was collected and characterized by using optical microscopy and DLS.

Example 6: Results and Discussion

I. Characteristics of Chain-Like Silica NPs and PAA-c-Silica NPs

Figure 3:
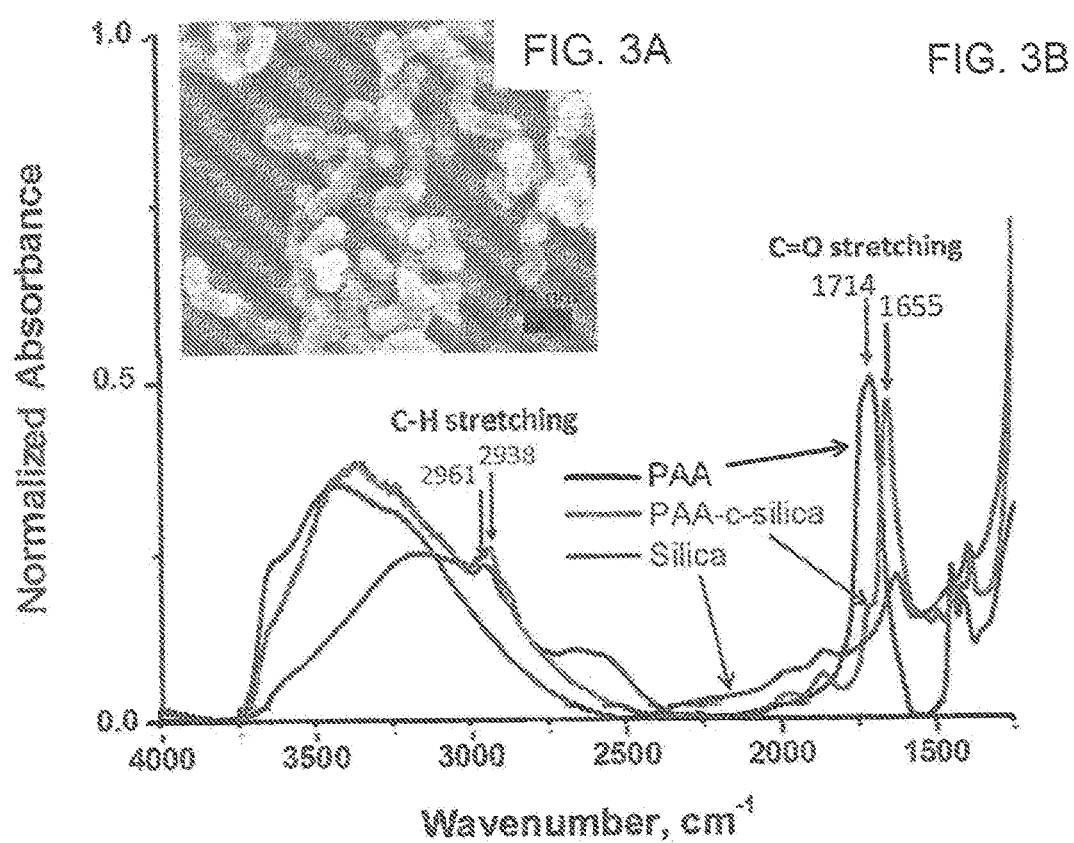
FIG. 3A is an SEM image of synthesized chain-like silica NPs.
FIG. 3B are the fourier-transform infrared (FT-IR) results using pure silica nanoparticles, poly(acrylic acid) (PAA), and PAA-c-silica NPs. Scale bar=100 nm.

Synthesized chain-like silica NPs were characterized by SEM (FIG. 3a). The linear length of chains ranged from 130 nm to 780 nm and the width of the chain ranged from 40 nm to 50 nm. The characteristics of the chain-like silica NPs could be tuned by adjusting the NPs seeds and TEOS concentration in the reaction. The FT-IR results (FIG. 3b) showed C-H stretching (2961 and 2938 $cm^{-1}$) and C=O stretching (1714 and 1655 $cm^{-1}$) peaks for both pure PAA and PAA-c-silica NPs, which were absent in the spectra of pristine chain-like silica NPs, confirming the successful grafting of PAA onto the chain-like silica NPs.

II. Characteristics of the NPs Coating

Figure 4:
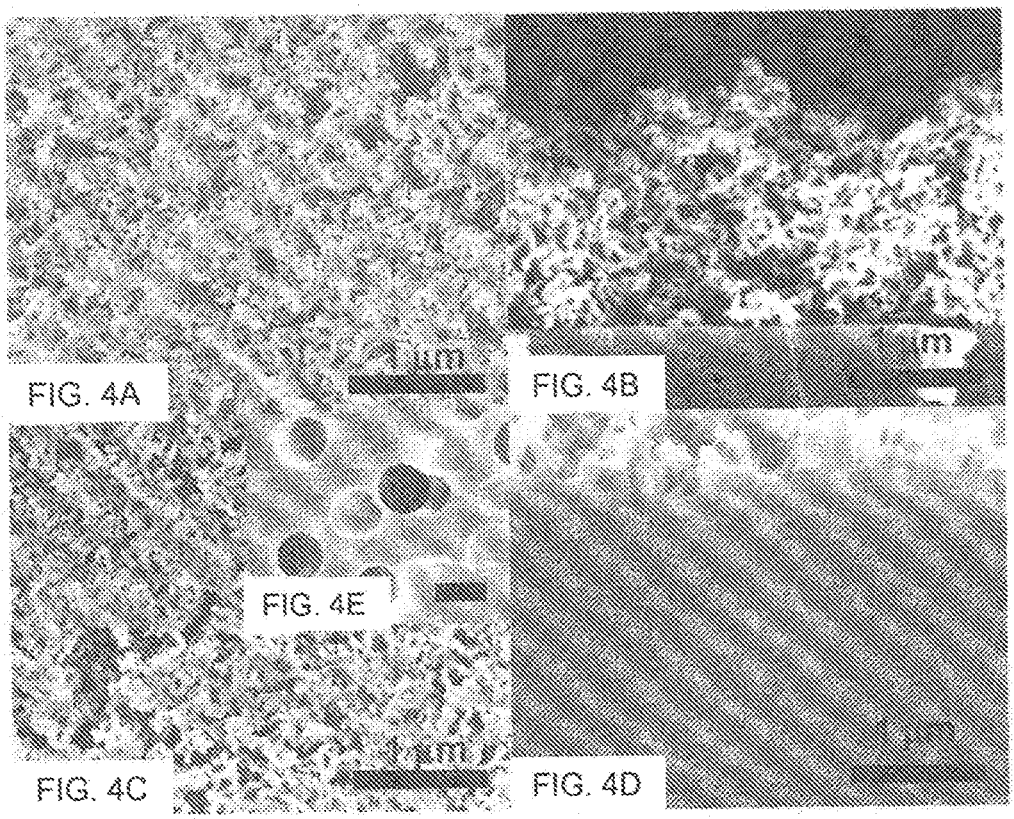

FIG. 4 summarizes the surface morphology of the PAA-c-silica NPs spray coated on Si wafer and PC membranes. From the SEM images, it was demonstrated that the coated surface was highly porous on both Si wafer (FIGS. 4a and 4b) and PC membrane (FIGS. 4c and 4d), and the resulting pore size of the coating was smaller than 1 µm. This will benefit both permeability and selectivity during the filtration, since high pore density provides more channels for liquid transport and nano-sized pores offer better selectivity to filtrate nano-sized emulsions. From FIGS. 4b and 4d, it was also clear that the top surface of the coating was very rough, which could not only enhance the water permeation by disrupting the disjoining pressure, but also have better wettability contrast (underwater superoleophobicity) by having more available sites for trapping water molecules. It was also shown that, beneath the top surface, many interconnected channels with size below 1 µm were available for liquid transport. This might also improve the permeation of the water. By comparing the coated (FIG. 4c) with the pristine PC membrane (FIG. 4e), it was clear that the NP coating was able to fully cover 1 µm pores without completely closing them. All these interesting morphologies of the coating were resulted from the unique shape of the chain-like NPs and the stacking pattern resulting from the spray coating. More importantly, these morphologies are desired for separating oil/water nanoemulsions.

III. Underwater Superoleophobicity of the NPs Coating

Figure 5:
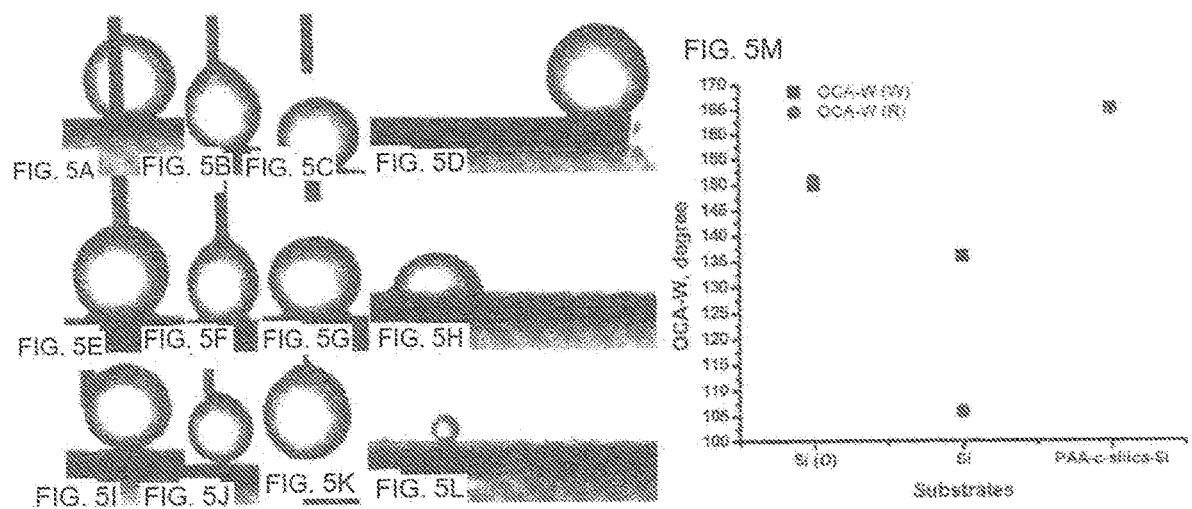
FIGS. 5A-C, E-G, and I-K are optical images of dropping 4 μL of DCE onto Si surface right after oxygen plasma treatment (FIGS. 5A-C), Si surface a few days after oxygen plasma treatment (Figures E-G), and PAA-c-silica NPs spray coated surface (Figures I-K).
FIGS. 5D, 5H, and 5L are optical images of the end states of DCE wetted Si surface right after oxygen plasma treatment (FIG. 5D), Si surface a few days after oxygen plasma treatment (FIG. 5H), and PAA-c-silica NPs spray coated surface (FIG. 5L) after being re-immersed into DI water.
FIG. 5M is a dot plot of a summary of OCA-W in wetted state and OCA-W in recovered state of Si surface right after oxygen plasma treatment, Si surface a few days after oxygen plasma treatment, and PAA-c-silica NPs spray coated surface.

For testing the underwater superoleophobicity of the coating, DCE was chose to be the oil phase because it is immiscible with water and has much lower surface tension ($\gamma$=38.75 mN/m at 20° C.) than water ($\gamma$=72.86 mN/m at 20° C.). Its density ($\rho$=1.253 $g/cm^3$) is also larger than water which also makes it easier to work with when measuring OCA-W. FIG. 5 summarizes the results of underwater superoleophobicity testing. It was demonstrated that the DCE drop cannot wet on the coated surface when it was touched by the coated surface (FIGS. 5i, 5j and 5k). The oil repellency stayed strong even the DCE drop was pressurized a little by the needle (FIG. 5i). Instead of wetting and adhering to the surface, the DCE drop rolled on the coated surface or stayed on the needle (FIGS. 5j and 5k). For the uncoated Si surface, the DCE was easily wetted and adhered to the surface (FIGS. 5a, 5b, 5c, 5e, 5f, and 5g). The resulting oil adhesion force was quite strong that it deformed the DCE droplet (FIGS. 5b and 5f) and finally stuck on the substrate (FIGS. 5c and 5g) when increasing the gap between the needle and the substrate after the DCE drop adhered. When DCE wetted surfaces re-immersed into DI water, the DCE film fully de-wetted from the coated Si surface, formed a sphere with low oil adhesion, and just rolled off from the surface (FIG. 5i). However, the DCE film only partially de-wetted from the un-coated Si surface and stuck on the surface (FIGS. 5d and 5h) due to the strong oil adhesion. FIG. 5m summarizes the OCA-W in both water wetted state and recovered state. From the absolute values and the difference between OCA-W(W) and OCA-W(R), it was showed that the un-coated Si surface cannot reach underwater superoleophobicity in either state (OCA-W(W)=136° and OCA-W(R)=106°), and its underwater superoleophobicity was severely compromised by immersing into the oil during the dried state. However, underwater superoleophobicity of the coated Si surface remained strong (OCA-W(W)=OCA-W(R)=165°) in both states. Even with oxygen plasma treatment, the coated Si surface was still better by having a higher OCA-W. This evidence indicates that the coating has excellent oil repellency underwater and can greatly reduce oil adhesion due to its enhanced water affinity from grafted PAA and high surface roughness for trapping water molecules. This is great for separating oil/water mixture and anti-fouling because of this high wettability contrast, low oil adhesion, and recover ability. It was also clear that the oxygen plasma treatment improved hydrophilicity of the uncoated Si surface by creating more hydroxyl groups, but it still had quite strong oil adhesion (FIG. 5b) and its improved hydrophilicity did not last very long.

IV. Separation of Oil-in-Water Emulsions

Hexadecane was chosen to be the oil for the filtration experiment due to its low surface tension ($\gamma$=27.47 mN/m at 20° C.) and immiscibility with water. Furthermore, it is lighter than water and it does not dissolve polycarbonate. The results showed that the stock emulsion had quite strong scattering effect (FIG. 6c) before the filtration due to the oil droplets dispersed in water. After filtration, the scattering effect is greatly reduced in the permeate (FIG. 6D). Under the optical microscope, micron-sized oil droplets were observed before the filtration in the stock emulsion (FIG. 6A) they were nearly gone in the permeate (FIG. 6B). For the nano-sized oil droplets, it was clear the average droplet size in the permeate was greatly reduced (from about 280 nm to 45 nm) by comparing size and distribution with the stock emulsion before the filtration (FIG. 6E). All these suggested successful separation of oil-in-water nanoemulsions using our NP coated membranes.

Example 7: Static Contact Angles, Contact Angle Hysteresis and Adhesion Hysteresis This example was performed to further illustrate the formation of the $SiO_2$ nanochains prepared as described herein at varying water ratios and using different substrates. FIG. 7A is a schematic of synthesizing $SiO_2$ nanochains.

(i) Preparation of the Non-Coated Substrate

For oxygen plasma treated silicon wafers ($O_2$-t-Si), the Si was rinsed by acetone first and then treated by oxygen plasma for 30 min.

(ii) Preparation of the Coated Substrates

The s-$SiO_2$, c-$SiO_2$, and PAA-c-$SiO_2$ substrates were prepared by spraying the dispersion of spherical $SiO_2$ nanoparticles, $SiO_2$ nanochains, and PAA grafted $SiO_2$ nanochains in ethanol, respectively, as follows.

The dried NPs and nanochains were first dispersed in ethanol by sonication to prepare the dispersion with 0.25 wt %, The dispersion was loaded into an airbrush which was connected to a pump, and then sprayed under pumping pressure of 20 psi onto the oxygen plasma cleaned Si substrate which was at 10 cm away from the airbrush tip until all loaded NPs dispersion ran out. See, FIG. 8B for the spray coating schematic. The thickness of the coating was controlled by the controlling the loading volume of the NPs dispersion and the surface area of the substrate. FIG. 7F is a schematic of grafting PAA onto $SiO_2$ nanochains.

The r-PAA-c-$SiO_2$ calcinated coated substrate was prepared using the procedure as the PAA-c-$SiO_2$ substrate. After the coating was applied, it was put into a furnace for at 450° C. for 3 hours, cooled down to room temperature in air, and treated with oxygen plasma for 30 min.

(iii) Results

SEM images of the substrates were obtained at varying stages. FIGS. 7B-7E are bar graphs showing the size distribution in terms of contour length of $SiO_2$ nanochains. The inset SEM images show the synthesized $SiO_2$ nanochains with the seeds to water ratio of 0.33, 0.56, 0.6, and 1. These data show that by tuning the reaction conditions, the contour length of chains was controlled. As the NPs seeds concentration added into the reaction increases, the contour length of the nanochains increases as shown in the figures. The concentration of TEOS was also adjusted to control the width of the chain to be around 50 nm.

FIG. 8A are images of 0.25 wt % of $SiO_2$ nanochain (left) and PAA grafted $SiO_2$ nanochain (right) dispersed in ethanol. FIGS. 8C-8H are SEM images of top view (C-D) and cross-section (F-H) of spherical $SiO_2$ NPs coating, $SiO_2$ nanochain coating, and PAA grafted $SiO_2$ nanochain coating. FIG. 8A shows that the nanochains can be well dispersed in ethanol to be ready for deposition. FIGS. 8C-8H compare the coating morphologies which are formed from spherical $SiO_2$ nanoparticles, $SiO_2$ nanochains, and PAA grafted $SiO_2$ nanochains. SEM images show that spherical $SiO_2$ NPs are densely packed and nanochains are loosely packed upon spraying. Thus, these results show that the nanochain coating is more porous, which is desired for achieving superwetting or underwater superoleophobicity.

(iv) The static oil contact angle (OCA) was measured by Model 200 (ramé-hart instrument co.) using sessile drop method. The substrate was immersed into a small glass tank filled with DI water that was sitting on the stage of the Model 200. A 4-μL drop of oil (dichloroethane, surface tension=33.3 mN/m) was then dropped underwater using a needle on top of the substrate that was connected to the dispenser of the Model 200. The picture was then captured by the camera of the Model 200, analyzed by the program and the contact angle was obtained.

The contact angle hysteresis (CAH) and adhesion hysteresis were both calculated from dynamic contact angles (advancing and receding contact angles) that were also measured using Model 200. It started with a sessile drop of oil the same way as the static contact angles. Then the needle was inserted into the drop and adding more oil stepwise. In each step, 0.25 μL of oil was added to the sessile drop and the picture was captured to measure the contact angles. Once the contact angle was stabilized and the width of the sessile drop was increased significantly in each step, the advancing contact angle ($\theta_{adv}$) was obtained. Instead of adding oil, the dispenser was then withdrawing oil stepwise with the same amount and procedure. Once the contact angle was stabilized again and the width of the sessile drop was decreased significantly in each step, the receding contact angle ($\theta_{rec}$) was obtained.

The contact angle hysteresis (CAH) was calculated using the formula below:

$$CAH = \theta_{adv} - \theta_{rec}$$

The calculation for adhesion hysteresis (AH) was described below:

Adhesion hysteresis, ΔW represents the difference between the energy gained from contacting of surfaces and the work of adhesion from separating the surfaces, and it can be expressed using the Equation S1.

$$\cos\theta_{adv} - \cos\theta_{rec} = \frac{\Delta W}{\gamma_{ow}} \quad \text{S1}$$

The $\theta_{adv}$, $\theta_{rec}$, and $\gamma_{ow}$ are the advancing contact angle, the receding contact angle, and the interfacial tension of the oil-water interface, respectively. Both dynamic contact angles were obtained using a goniometer. The oil water interfacial tension can be calculated using the Young's equation (Equation S2) for an oil droplet on a smooth solid surface underwater environment.

$$\cos\theta_{ow} = \frac{\gamma_{sw} - \gamma_{so}}{\gamma_{ow}} \quad \text{S2}$$

The $\theta_{ow}$, $\gamma_{sw}$, and $\gamma_{so}$ are the static oil contact angles underwater, the interfacial energy of the solid-water interface, and the interfacial energy of the solid-oil interface, respectively. Here, the static oil contact angle was obtained from goniometer. Parameters $\gamma_{sw}$ and $\gamma_{so}$ cannot be obtained directly through experiments. Therefore, a manipulation was made using Equation S2 to provide Equation S3.

$$\cos\theta_{ow} = \frac{\gamma_{sw} - \gamma_{so} + (\gamma_{sa} - \gamma_{sa})}{\gamma_{ow}} = \frac{(\gamma_{sa} - \gamma_{so}) - (\gamma_{sa} - \gamma_{sw})}{\gamma_{ow}} \quad \text{S3}$$

Now considering a system of a water droplet on a smooth solid surface in air and an oil droplet on a smooth solid surface in air, Equations S4 and S5 can be obtained using Young's model.

$$\gamma_{wa} \cos\theta_{wa} = \gamma_{sa} - \gamma_{sw} \quad \text{S4}$$

$$\gamma_{oa} \cos\theta_{oa} = \gamma_{sa} - \gamma_{so} \quad \text{S5}$$

They were substituted into Equation S3 to provide Equation S6.

$$\cos\theta_{ow} = \frac{\gamma_{oa}\cos\theta_{oa} - \gamma_{wa}\cos\theta_{wa}}{\gamma_{ow}} \quad \text{S6}$$

The $\gamma_{oa}$ and $\gamma_{wa}$ are the surface tension of oil and water, respectively, which can be obtained from available physical data. The $\theta_{ow}$, $\theta_{oa}$, and $\theta_{wa}$ are the static contact angles of oil-water interface, oil-air interface, and water-air interface, respectively, which all can be measured using a goniometer. Therefore, the interfacial tension of the oil-water interface ($\theta_{ow}$) can be calculated. For DCE used in the experiment, $\gamma_{ow}$ is calculated to be 40 mN/m. Using calculated interfacial tension and dynamic contact angles obtained from the experiment, the adhesion hysteresis was calculated using Equation S1.

Figure 9A:
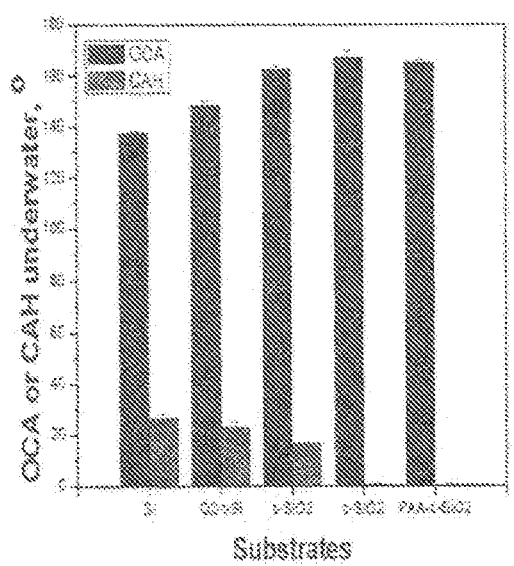
FIG. 9A is a bar graph of static oil contact angles (OCA) and contact angles hysteresis (CAH) underwater.
Figure 9B:
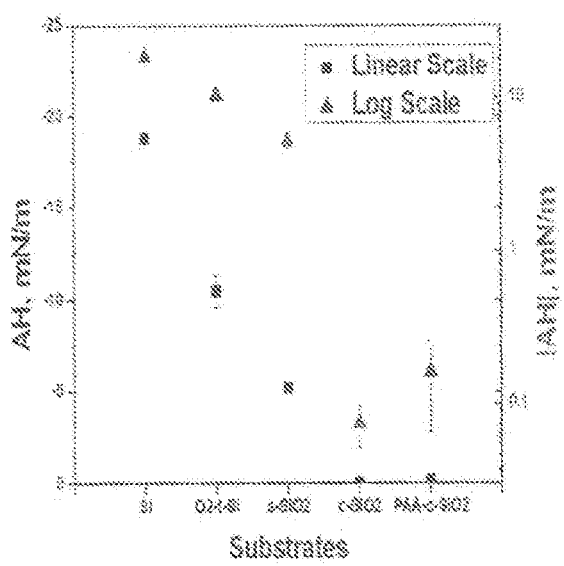
FIG. 9B is a plot of adhesion hysteresis (AH) of pristine Si, oxygen plasma treated Si($O_2$-t-Si), spherical $SiO_2$ NPs coating (s-$SiO_2$), $SiO_2$ nanochain coating (c-$SiO_2$) and PAA grafted $SiO_2$ nanochain coating (PAA-c-$SiO_2$).

FIG. 9A is a bar graph of static oil contact angles (OCA) and contact angles hysteresis (CAH) underwater. FIG. 9B is a plot of adhesion hysteresis (AH) of pristine Si, oxygen plasma treated Si($O_2$-t-Si), spherical $SiO_2$ NPs coating (s-$SiO_2$), $SiO_2$ nanochain coating (c-$SiO_2$) and PAA grafted $SiO_2$ nanochain coating (PAA-c-$SiO_2$). These results illustrate that after coating with $SiO_2$ NPs or nanochains, the coated substrate has underwater superoleophobicity (OCA>150°). However, only the coating from nanochains have very low CAH and AH, indicating low oil adhesion. This shows that the oil drop is highly mobile on the surface, which is a piece of information the static contact angles (OCA) alone cannot provide. Similarly, the log scale of the AH plot shows the significant adhesion drop only occur for nanochain coatings.

Example 8: Oil Dewetting Underwater

Figure 10A:
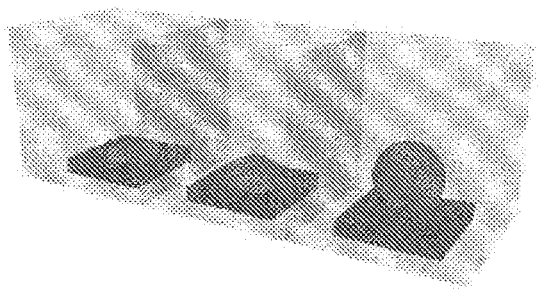
FIG. 10A is a schematic of an oil dewetting experiment.

A 4-μL drop of oil containing 99 wt % of trimethylolpropane ethoxylate triacrylate (ETPTA) and 1 wt % of 2-hydroxy-2-methylpropiophenoneof (HMPP) was dropped by a micropipet onto the substrate in air. Once the oil was completely spread on the substrate surface, the substrate was immersed into DI water. FIG. 10A is a schematic of the oil dewetting experiment. The process was recorded using camera on iPhone.

Figure 10B:
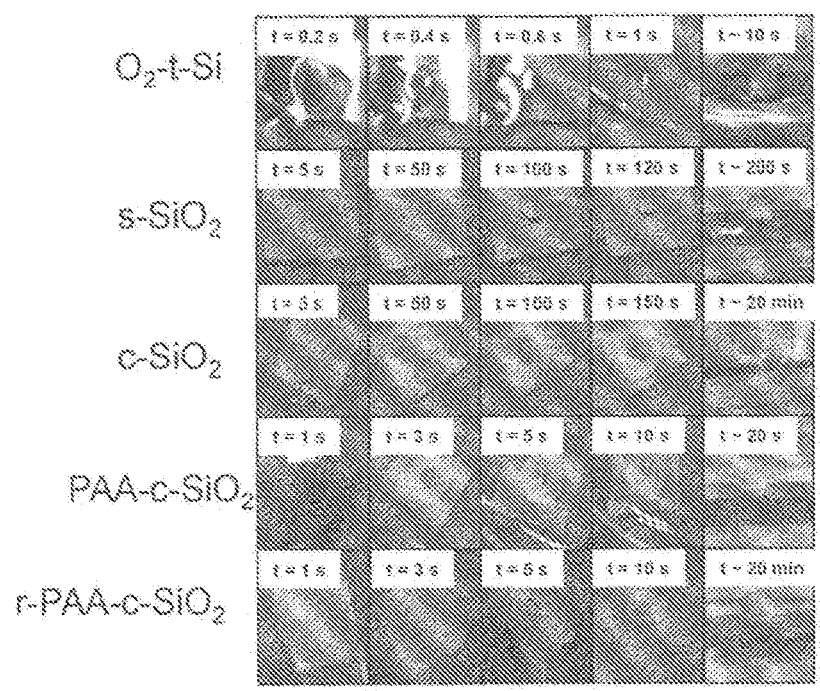
FIG. 10B are images of oil dewetting performed at varying times (t) and equilibrium of an oxygen plasma treated Si($O_2$-t-Si) substrate, spherical $SiO_2$ NP coated substrate (s-$SiO_2$), $SiO_2$ nanochain coated substrate (c-$SiO_2$), PAA grafted $SiO_2$ nanochain coated substrate (PAA-c-$SiO_2$), and PAA grafted $SiO_2$ nanochain coated substrate with removal of PAA by calcination (r-PAA-c-$SiO_2$).

FIG. 10B are images of oil dewetting performed at varying times (t) and equilibrium of an oxygen plasma treated Si($O_2$-t-Si) substrate, spherical $SiO_2$ NP coated substrate (s-$SiO_2$), $SiO_2$ nanochain coated substrate (c-$SiO_2$), PAA grafted $SiO_2$ nanochain coated substrate (PAA-c-$SiO_2$), and PAA grafted $SiO_2$ nanochain coated substrate with removal of PAA by calcination (r-PAA-c-$SiO_2$).

These results illustrate that the $O_2$-t-Si substrate shows the oil can dewet very fast on smooth hydrophilic surfaces upon introducing of water, but only partially. The oil cannot completely dewet and detach from the surface. With the coating of spherical $SiO_2$ NPs (s-$SiO_2$), the dewetting process becomes much slower and the oil only partially dewets and does not detach from the surface. However, with the coating of $SiO_2$ nanochains (c-$SiO_2$), the oil drop can completely dewet underwater and eventually detach from the surface. Finally, the substrate with a coating of $SiO_2$ nanochains grafted with PAA (PAA-c-$SiO_2$), the oil drop not only can completely dewet and detach from the surface underwater, it also happens very fast. Finally, the r-PAA-c-$SiO_2$ sample (PAA-c-SiO2 which went through a calcination process to remove the grafted PAA), shows that after calcination, the dewetting process slows down significantly.

It is to be understood that while the invention has been described in conjunction with the preferred specific embodiments thereof, that the foregoing description and the examples that follow are intended to illustrate and not limit the scope of the invention. It will be understood by those skilled in the art that various changes may be made and equivalents may be substituted without departing from the scope of the invention, and further that other aspects, advantages and modifications will be apparent to those skilled in the art to which the invention pertains. In addition to the embodiments described herein, the present invention contemplates and claims those inventions resulting from the combination of features of the invention cited herein and those of the cited prior art references which complement the features of the present invention. Similarly, it will be appreciated that any described material, feature, or article may be used in combination with any other material, feature, or article, and such combinations are considered within the scope of this invention.

The disclosures of each patent, patent application, and publication cited or described in this document are hereby incorporated herein by reference, each in its entirety, for all purposes.

What is claimed:

1. A networked composition, comprising anisotropic chain-like silica nanoparticles functionalized with hydrophilic groups;
    wherein said anisotropic chain-like silica nanoparticles are a network comprising linked arrays of charged silica nanoparticles, each linked array having at least one linear dimension of from about 100 nm to about 1200 nm and said anisotropic chain-like silica nanoparticles each having a diameter of from about 10 nm to about 500 nm, and wherein the composition is superoleophobic in the presence of water.

2. The networked composition of claim 1, which is superoleophobic in the presence of water.

3. The networked composition of claim 1, wherein said hydrophilic groups are negatively charged.

4. The networked composition of claim 1, wherein said hydrophilic groups comprise hydroxyls, carbonyls, carboxyls, sulfonates, phosphates, ethers, esters, phosphodiesters, glycolytic linkages, peptides, or combinations thereof.

5. The networked composition of claim 4, wherein:
    (i) said phosphodiester comprises a nucleic acid; or
    (ii) said glycolytic linkage comprises a disaccharide, polysaccharide, or combination thereof; or
    (iii) said peptide comprises a polypeptide, protein, or combination thereof; or
    (vi) said carboxyl groups are carboxylic acids.

6. The networked composition of claim 1, wherein said hydrophilic groups are positively charged.

7. The networked composition of claim 6, wherein said hydrophilic groups comprise amino groups.

8. The networked composition of claim 1, wherein said hydrophilic groups are zwitterions.

9. The networked composition of claim 8, wherein said zwitterion comprises an amino acid, bicine, tricine, alkaloid, quaternary ammonium cation, phospholipid, or combination thereof.

10. The networked composition of claim 1, wherein the at least one linear dimension of from about 130 nm to about 780 nm.

11. The networked composition of claim 1, wherein the average cross sectional dimension of at least one silica nanoparticle is from about 40 to about 50 nm.

12. The networked composition of claim 1, wherein the linked arrays of charged silica nanoparticles are branched.

13. The networked composition of claim 1, comprising about 4 to about 20 charged silica nanoparticles per linked array.

14. A superoleophobic article comprising, a layered coating adhered to a substrate surface, the layered coating comprising a layer of anisotropic chain-like silica nanoparticles functionalized with hydrophilic groups, wherein:
    said anisotropic chain-like silica nanoparticles comprising linked arrays of charged silica nanoparticles, each linked array having at least one linear dimension of from about 100 nm to about 1200 nm and said anisotropic chain-like silica nanoparticles each having a diameter of from about 10 nm to about 500 nm;

the substrate surface comprises surface active moieties carrying a net charge;

said anisotropic chain-like silica nanoparticles are held to said surface; and said layered coating conforms to a surface topography defined by the anisotropic chain-like silica nanoparticles on the substrate.

15. The superoleophobic article of claim 14, wherein said substrate has a porosity of from about 10 to about 80 vol %.

16. The superoleophobic article of claim 14, wherein the substrate has a pore diameter of less than about 2 µm.

17. The superoleophobic article of claim 14, wherein said topography is roughness from about 20 to about 200 nm.

18. The superoleophobic article of claim 14, wherein said coating has a porosity of at least about 36%.

19. The superoleophobic article of claim 14, which has a thickness of about 100 nm to about 10 µm.

20. A method of making a membrane, the method comprising:
    (i) contacting a substrate with water; and
    (ii) contacting the substrate of step (i) with a solution comprising the composition of claim 1 to provide the membrane.

21. A method of preparing a coating on a substrate, comprising:

(a) depositing a layer of anisotropic chain-like silica nanoparticles comprising hydrophilic groups on said substrate; and
    (b) washing the product of step (b) with water, wherein:
    said anisotropic chain-like silica nanoparticles comprising linked arrays of charged silica nanoparticles, each linked array having at least one linear dimension of from about 100 nm to about 1200 nm and said anisotropic chain-like silica nanoparticles each having a diameter of from about 10 nm to about 500 nm; and
    said layered coating conforms to a surface topography defined by the anisotropic chain-like silica nanoparticles on the substrate.

22. A superoleophobic article prepared according to the method of claim 21.

23. A method of filtering a mixture of water and an oil, the method comprising:
    (i) contacting a superoleophobic article according to claim 14 with the mixture of water and an oil;
    wherein said water passes through said membrane and less than about 100 ppm of oil passes through said membrane; and
    (ii) collecting said water passed through said superoleophobic article of step (i).

\* \* \* \* \*